United States Patent [19]

Michel

[11] Patent Number: 4,505,580

[45] Date of Patent: Mar. 19, 1985

[54] METHOD AND APPARATUS FOR GENERATING EXPOSURE MASKS

[75] Inventor: Dieter Michel, Traunstein, Fed. Rep. of Germany

[73] Assignee: Dr. Johannes Heidenhain GmbH, Traunreut, Fed. Rep. of Germany

[21] Appl. No.: 435,705

[22] Filed: Oct. 21, 1982

[30] Foreign Application Priority Data

Oct. 23, 1981 [DE] Fed. Rep. of Germany ....... 3142025

[51] Int. Cl.³ .................. G03B 27/42; G03B 27/52
[52] U.S. Cl. ........................................ 355/53; 355/55
[58] Field of Search .................... 355/53–56, 355/77; 354/4

[56] References Cited

U.S. PATENT DOCUMENTS

| | | | |
|---|---|---|---|
| 3,940,211 | 2/1976 | Johannsmeir | 355/54 X |
| 4,110,762 | 8/1978 | Tigreat | 355/53 X |
| 4,225,225 | 9/1980 | Hyatt | 355/53 X |
| 4,422,754 | 12/1983 | Isowata et al. | 355/53 X |

OTHER PUBLICATIONS

Master Artwork Generator Sys. by H. H. Bloem et al. Article in IBM Technical Disclosure Bulletin, vol. 21, No. 9, Feb. 1979.

*Primary Examiner*—L. T. Hix
*Assistant Examiner*—Della J. Rutledge
*Attorney, Agent, or Firm*—Willian, Brinks, Olds, Hofer, Gilson & Lione Ltd.

[57] ABSTRACT

A method and apparatus for generating exposure masks is disclosed which markedly reduces the number of required process steps. A plurality of recording originals are successively reproduced in reduced form on a photosensitive recording substrate. These reduced size images are adjusted and placed in registry with respect to one another by means of a computer. In order to achieve this desired result, the computer calculates from the prescribed desired coordinate values and the measured actual coordinate values of index marks included on the recording original, an angle $\Delta\phi$ through which the recording original must be rotated to achieve the desired orientation. The computer then acts to determine the corrected actual coordinate values of the diagonal intersection point and from these the coordinate values at which the recording substrate is to be positioned to achieve the desired in registry reproduction of the reduced size image of the recording original. This process is repeated for a number of recording originals, reduced size images of which are successively reproduced on the recording substrate, which is in each case appropriately positioned by means of the computer. The recording substrate is then developed, and the desired exposure mask is produced by photolithographic techniques.

13 Claims, 6 Drawing Figures

METHOD AND APPARATUS FOR GENERATING EXPOSURE MASKS

BACKGROUND OF THE INVENTION

This invention relates to a process and an apparatus for generating exposure masks made up of at least two reduced-size images of recording originals, which reduced-size images are precisely positioned with respect to one another. Such exposure masks are, for example, useful for producing a high density storage medium such as a multicolor micro-image.

Exposure masks of the type described above are used, for example, in the production of multicolor micromaps. From multicolor original maps (for example on the scale of 1:50,000) color separations in the form of negative film originals (for example separate separations for black, red, green, and blue portions of the map) are made for each other. These negative film originals are then reproduced in reduced form individually on photosensitive micro-original carriers of glass. After being developed, the micro-original carriers are vapor-treated with a chromium layer, and then remaining portions of the photosensitive layer are removed along with the overlying chromium layer. These positive micro-originals are then used to produce negative micro-originals by contact copy.

If, for example, a map formation of several adjacent original maps (for example 5×5=25 maps) is to be recorded on a recording carrier or substrate, then the corresponding negative micro-originals for each color must be manually adjusted and positioned with respect to one another in the recopying step, so that a negative micro-original of the entire map formation is obtained for each color. First, the negative micro-originals of the black or background separation, for example, are adjusted and positioned crosswise from the center of the original formation, and then the other negative micro-originals are positioned with respect to one another and copied. For this purpose, there are required at least six copying or vapor treatment steps.

From the positive original formation thus obtained for the production of the exposure masks for the remaining colors, in each case a negative original formation is created. On this negative original formation retouching techniques are used to remove all the details down to the index marks in the form of corner markings of the individual originals (in topographical maps the so-called sheet corners). The color separations are then adjusted into place and copied.

The production of exposure masks by the process described above requires about 225 copying steps (coating with a photosensitive layer, exposing and developing the photosensitive layer, and vaporizing with a chromium layer) and about 204 micro-original carriers of glass of high surface quality to produce a map formation of 25 maps.

SUMMARY OF THE INVENTION

The present invention is directed to an improved apparatus and process for generating such exposure masks, in which the number of process steps and thereby the cost and the time required to generate the exposure masks can be substantially reduced.

According to this invention, a process is provided for generating exposure masks for the production of a high resolution recording medium. This process includes the steps of first providing an exposure system which includes first means for holding a recording original in place, second means for holding a recording substrate in first place, means for projecting a reduced size image of the recording original onto the recording substrate, and a computer programmed to generate a plurality of desired position signals based on the known position of the recording original and the desired position of the reduced-size image of the recording original on the recording substrate. A first recording original is mounted in the first means, and a first recording substrate is mounted in the second means. Then, information is stored in the computer indicative of the known position of the first recording original and the desired position of the image of the first recording original on the first recording substrate. The computer is then operated to automatically generate a plurality of desired position signals indicative of a desired relative position of the first recording substrate with respect to the first recording original to reproduce a first reduced-size image of the first recording original at the desired position on the first recording substrate. The relative position of the recording substrate with respect to the recording original is then adjusted in accordance with the desired position signals, and a reduced-size image of the first recording original is then reproduced at the desired position. Then the exposure system is used to reproduce a second reduced-size image on the first recording substrate at a predetermined position with respect to the first reduced-size image.

This invention provides the important advantages that a set of four exposure masks for the production of a four-color recording medium can be produced with only four exposure mask carriers and one photolithographic step.

The invention itself, together with further objects and attendant advantages, will best be understood by reference to the following detailed description taken in conjunction with the accompanying drawings.

BRIEF DESCRIPTION OF THE DRAWINGS

FIG. 2b is a side view of the embodiment of FIG. 2a.

FIG. 2c is a top view of the embodiment of FIG. 2a.

DETAILED DESCRIPTION OF THE PRESENTLY PREFERRED EMBODIMENTS

Figure 1:
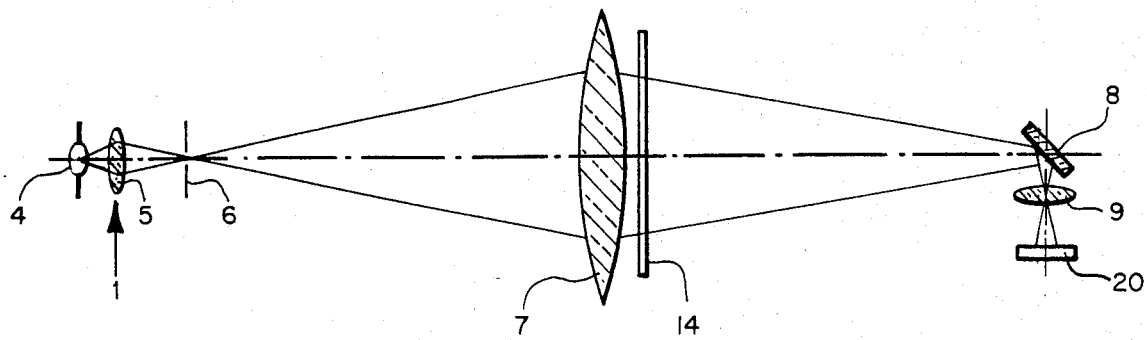
FIG. 1 is a schematic representation of an apparatus for generating exposure masks.

Turning now to the drawings, FIG. 1 shows a schematic representation of a projection system which includes an illumination unit 1, a condenser lens 7, a recording original 14, and a recording substrate 20. This recording substrate 20 will form an exposure mask of the type described above when completely fabricated. The illumination unit 1 includes a mercury vapor, high pressure lamp 4, a condenser lens 5, a diaphragm 6, as well as a monochromatic filter (not shown) and an exposure shutter (not shown). The illumination unit 1 directs light along a beam path through the condenser lens 7 and the recording original 14 to a deflecting mirror 8. This deflecting mirror 8 deflects the light transmitted by the recording original 14 through a reproducing objective lens 9 onto the recording substrate 20.

Figure 2A:
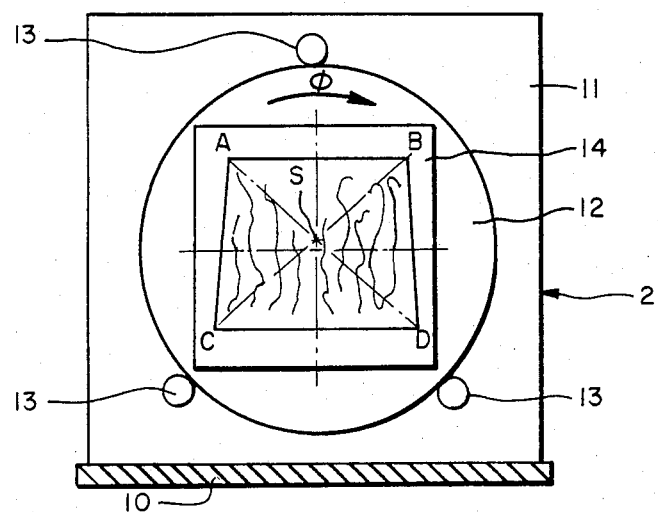
FIG. 2a is a sectional view taken along line 2a—2a of FIG. 2b of a first preferred embodiment of the apparatus of this invention.
Figure 2B:
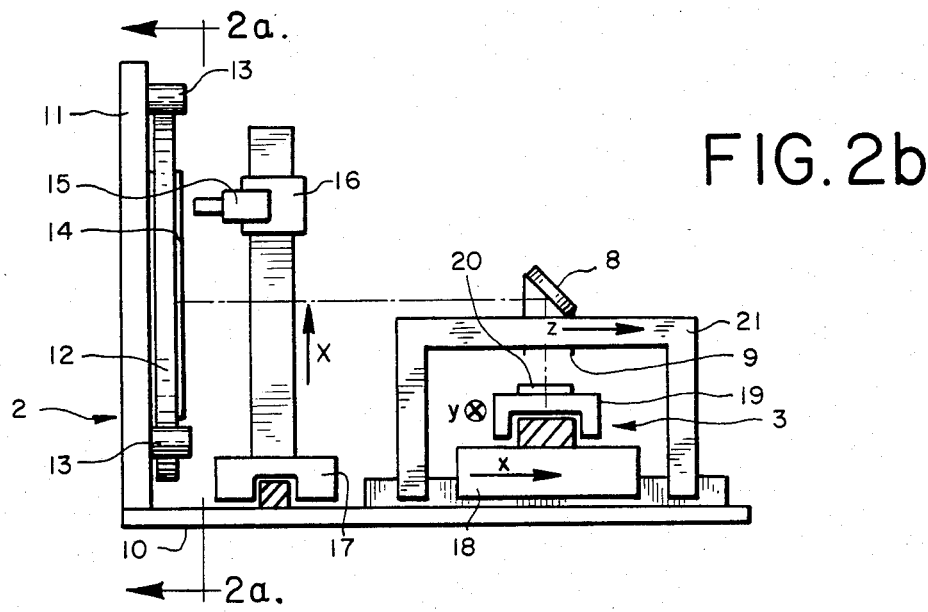
Figure 2C:
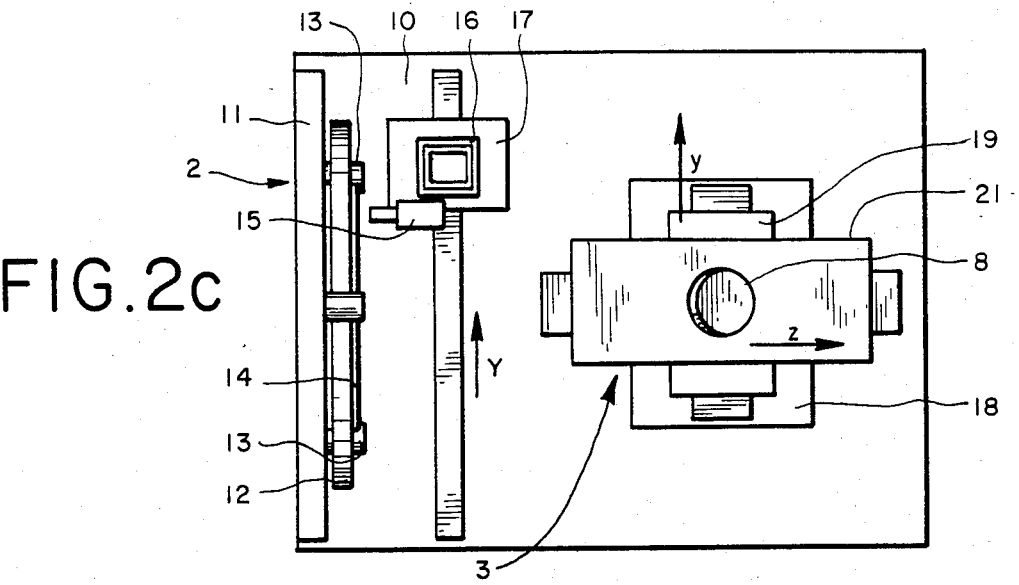
Figure 4:
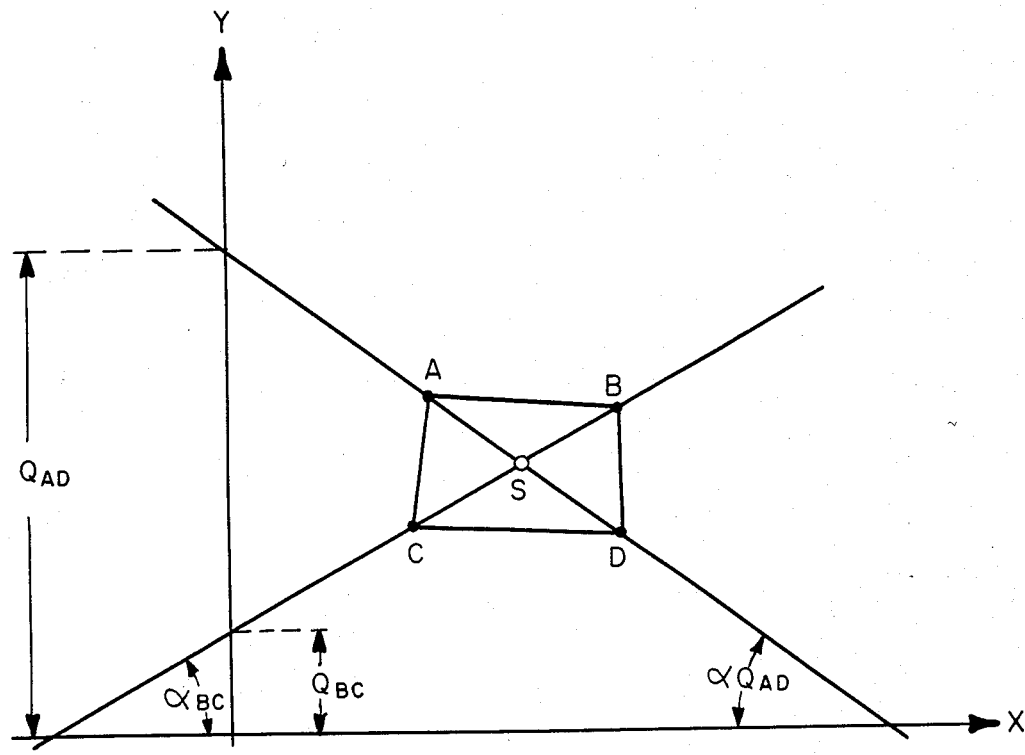
FIG. 4 is a drawing of a recording original which defines certain variables referenced in the following description, and in Table 1 particularly.

Turning now to FIGS. 2a, 2b, and 2c, the reference numeral 2 is used to indicate a holding apparatus for securely holding in place the recording original 14. This holding device 2 includes a frame 11 which is mounted to a base plate 10. A circular planar plate 12 is mounted on the frame 11 so as to rotate between three rolls or bearings 13 about a horizontal axis. As shown in FIG. 2b, the axis of rotation of the plate 12 is parallel to the beam path described above in conjunction with FIG. 1. In FIG. 2a the reference symbol $\phi$ is used to designate the angular position of the plate 12 about its axis of rotation. The recording original 14 is secured by means of suction strips (not shown) to the plate 12. The suction strips are adjustable parallel to the plane plate 12 in order to securely clamp the recording original 14 in place. The recording original 14 includes four index marks, A, B, C, D, which are situated at the sheet corners of the recording original. As shown in FIGS. 2b and 2c, this embodiment of the invention includes a video microscope 15, which is movable by means of an airborne slide piece 16 along the X direction. The slide piece 16 is in turn mounted on an airborne slide piece 17 which is slidable in the Y direction with respect to the base plate 10.

As best seen in FIGS. 2b and 2c, a holding device 3 is provided for the recording substrate 20. The holding device 3 includes an airborne slide piece 18 which is slidable in the x direction on the base plate 10. This slide piece 18 in turn carries an airborne slide piece 19 which is slidable in the y direction, and the recording substrate 20 is secured to the slide piece 19 by suction techniques. The deflection mirror 8 and the objective lens 9 are mounted on an additional airborne slide piece 21 which is slidable in the z direction on the base plate 10. Thus, the deflection mirror 8 and the reproduction objective lens 9 move along the beam path of the projection system. The various slide pieces 16, 17, 18, 19, 21 are in each case coupled (in a manner not shown) to a respective digital electronic length measuring system $L_X$, $L_Y$, $L_x$, $L_y$, $L_z$ of known constructions. The frame 11 and the plate 12 are coupled with a digital electronic angle measuring system W of a known type. The length measuring systems $L_X$, $L_Y$, $L_x$, $L_y$, $L_z$ are connected to a computer R, and the angle measuring system W is connected to a counter Z. All this is clearly shown in FIG. 3.

Figure 3:
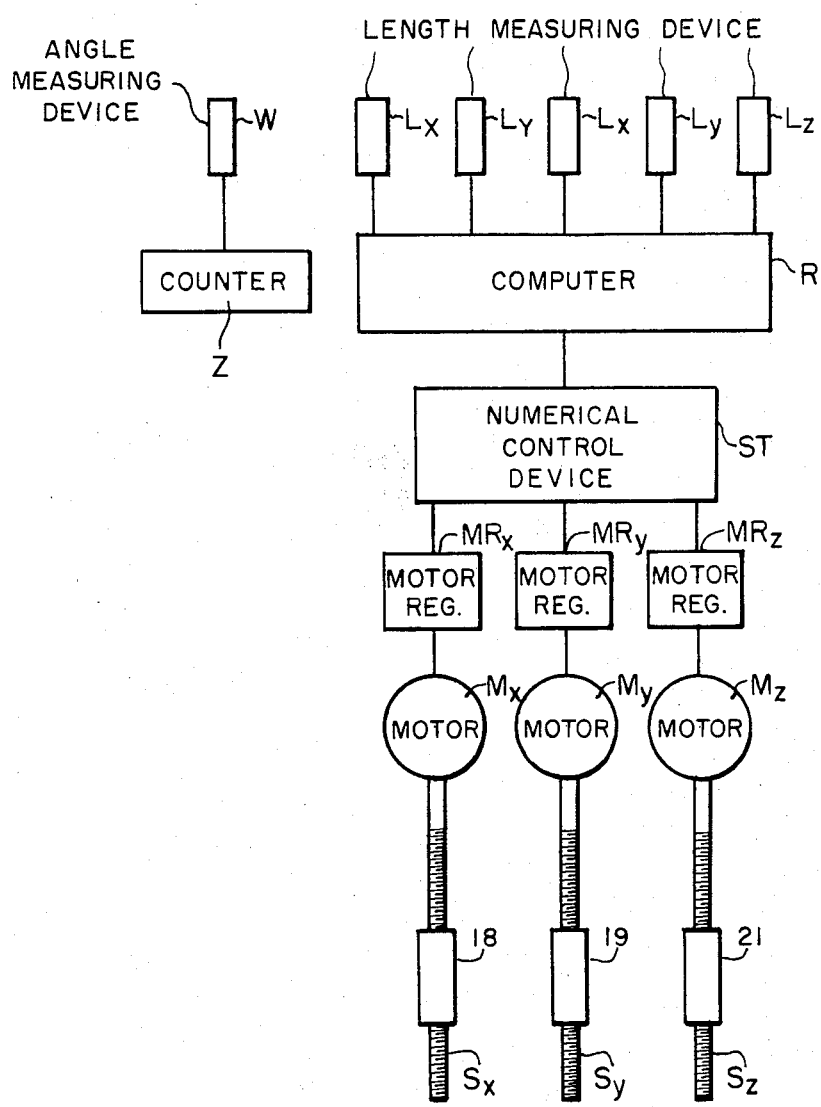
FIG. 3 is a schematic representation of the electronic control system included in the embodiment of FIGS. 2a, 2b, and 2c.

According to this invention, the apparatus shown in FIGS. 2 and 3 is utilized by first securing the recording substrate 20 to the slide piece 19 and the recording original 14 to the plate 12. The index marks A,B,C,D included in the recording original 14 (which are preferably illuminated by an auxillary illuminating device, not shown in FIG. 2 or 3) are then manually sighted successively by means of the videomicroscope 15, and the actual coordinate values $X_{actual}$, $Y_{actual}$ together with a respective code number identifying the index mark are transferred into the computer R. In addition, the known desired coordinate values $X_{desired}$, $Y_{desired}$ of the index marks A,B,C,D of the recording original 14 are also stored in the computer R. For example, the index marks A,B,C,D can take the form of sheet corners of the original maps.

The computer then determines the following parameters by comparing the actual coordinate values $X_{actual}$, $Y_{actual}$ of the index marks A,B,C, and D with respect to the respective desired coordinate values $X_{desired}$, $Y_{desired}$:

(a) The actual angular position value $\phi_{actual}$ with respect to the desired angular position value $\phi_{desired}$ resulting from the desired coordinate values $X_{desired}$, $Y_{desired}$ (see Equation 1 of Table 1);

(b) The actual lengths of the diagonals between the index marks A,B,C,D (Equation 2);

(c) The actual coordinate values $X_S$, $Y_S$ of the actual diagonal intersection point S (Equation 3); and (d) The reduction scale correction factor K as a result of a comparison between the actual and desired diagonal lengths (Equation 4).

The correction value K is used to correct for deviations in the sizes of the recording originals caused by factors such as humidity, the production process, and the like. This correction value makes possible exact registration between maps in a formation, without gaps therebetween.

The plate 12 with the recording original 14 mounted thereon is then manually rotated by an angle $\Delta\phi$ which is equal to the difference between the $\phi_{actual}$ and $\phi_{desired}$ determined by the computer R and displayed in a display unit (not shown) of the computer R. This rotation of the plate 12 by the desired angular value $\Delta\phi$ is accomplished with the aid of the counter Z which has been previously set to zero.

After the plate 12 has been rotated as described above, the computer is then used to determine the following parameters:

(a) The new actual coordinate values $X_S'$, $Y_S'$ of the diagonal intersection point S (Equation 6) and corrects these new actual coordinate values $X_S'$, $Y_S'$ with the correction factor K;

(b) The commanded coordinate values x,y to which the recording substrate 20 is to be positioned (the values x,y are computed from the corrected new actual coordinate values $X_S'$, $Y_S'$ of the diagonal intersection point S and from the desired coordinate values $X_{SO}$, $Y_{SO}$ of the desired diagonal intersection point $S_O$; see Equation 7); and (c) The commanded coordinate value z at which the deflecting mirror 8 is to be positioned with respect to the beam path and the sharpness correction value with respect to the distance between the objective lens 9 and the recording substrate 20 (these parameters are calculated from the known focal length of the objective lens 9 and the correction value K; see Equation 8).

The distance between the objective lens 9 and the recording substrate 20 is then corrected when the sharpness correction value exceeds a certain amount, for example, an amount greater than 1 micron.

At this point, the recording substrate 20 is positioned with respect to the commanded coordinate values x,y,z by means of a numerical control device ST which is coupled to the computer R. This numerical control device ST acts by means of motor regulators $MR_x$, $MR_y$, $MR_z$ to control servo motors $M_x$, $M_y$, $M_z$ which act to shift the slide pieces 18, 19, 21 by means of spindles $S_x$, $S_y$, $S_z$, respectively. In this way, the recording substrate 20 and the deflecting mirror 8 and the objective lens 9 are automatically positioned by the computer R at the previously determined positions which will result in a properly positioned reduced-size image of the recording original 14 on the recording substrate 20.

A reduced-size image of the recording original 14 is then formed on the photosensitive recording substrate 20 by the numerical control device ST by appropriate control of the exposure shutter.

Once a first recording original 14 has been imaged and reproduced on the recording substrate 20, a next recording original 14 is then mounted on the plate 12, and the entire process is then repeated. Of course, the desired coordinates of the image of the second recording original 14 are modified so as to bring the reduced-size image of the second recording original 14 into exact registration with respect to the reduced-size image of the first recording original 14. In this way, all of the recording originals 14 which are included in the particular formation being reproduced are reproduced on the recording substrate. After all of the recording originals 14 of an original formation have been successively reproduced in reduced form in the above-described manner on the photo-sensitive recording substrate 20, the recording substrate 20 is then developed, and a chromium layer is vapor-deposited over the remaining photosensitive material. This remaining photosensitive material is then removed, together with the overlying chromium layer, to produce an exposure mask. The exposure mask generated in this way can be used, for example, for the production of a multicolor microtopographical map.

From the foregoing description, it should be apparent that the method and apparatus of this invention can be used to dramatically reduce the number of copying steps and to increase the ease with which complex exposure masks can be made.

Of course, it should be understood that various changes and modifications to the preferred embodiment described above will be apparent to those skilled in the art. It is therefore intended that the foregoing detailed description be regarded as illustrative rather than limiting, and that it be understood that it is the following claims, including all equivalents, which are intended to define the scope of this invention.

TABLE I

Equation 1

$$\phi_{actual} = \frac{\alpha_{BC(actual)} + \alpha_{AD(actual)}}{2},$$

where $\alpha_{BC(actual)} = \arctan \frac{Y_B - Y_C}{X_B - X_C}$ and $\alpha_{AD(actual)} = \arctan \frac{Y_A - Y_D}{X_A - X_D}$.

($X_A$, $X_B$, $X_C$, $X_D$ = the $X_{actual}$ coordinates of index marks A,B,C,D, respectively; $Y_A$, $Y_B$, $Y_C$, $Y_D$ = the $Y_{actual}$ coordinates of index marks A,B,C,D, respectively.)

$\phi_{desired}$ is determined in an analogous manner based on the desired coordinate values of the index marks.

Equation 2

$$\overline{BC_{actual}} = \sqrt{(Y_B - Y_C)^2 + (X_B - X_C)^2}$$

$$\overline{AD_{actual}} = \sqrt{(Y_A - Y_D)^2 + (X_D - X_A)^2}$$

Equation 3

$$X_S = \frac{Q_{BC} - Q_{AD}}{M_{AD} - M_{BC}}$$

TABLE I-continued $$Y_S = \frac{Q_{BC} \cdot M_{AD} - Q_{AD} \cdot M_{BC}}{M_{AD} - M_{BC}}$$

where $Q_{BC} = Y_C - X_C \cdot \frac{Y_B - Y_C}{X_B - X_C}$, $Q_{AD} = Y_A - X_A \cdot \frac{Y_A - Y_D}{X_A - X_D}$, $M_{BC} = \frac{Y_B - Y_C}{X_B - X_C}$, and $M_{AD} = \frac{Y_A - Y_D}{X_A - X_D}$.

Equation 4

$$K = \frac{\overline{BC_{actual}} + \overline{AD_{actual}}}{\overline{BC_{desired}} + \overline{AD_{desired}}}$$

Equation 5

$$\Delta\phi = \phi_{desired} - \phi_{desired}$$

$$= \frac{\alpha_{BC(desired)} + \alpha_{AD(desired)}}{2} - \frac{\alpha_{BC(actual)} + \alpha_{AD(actual)}}{2}$$

Equation 6

$$X_S' = r \cdot \cos w_2$$

$$Y_S' = r \cdot \sin w_2, \text{ where}$$

$$r = \sqrt{X_s^2 + Y_s^2},$$

$$w_1 = \arctan \frac{Y_S}{X_S}, \text{ and}$$

$$w_2 = w_1 + \Delta\phi$$

Equation 7

$$x = \frac{X_{SO}}{V} + \frac{X_S'}{K \cdot V}$$

$$y = \frac{Y_{SO}}{V} + \frac{Y_S'}{K \cdot V}$$

where V = reduction factor

Equation 8

$$z = f\left(2 + K \cdot V + \frac{1}{K \cdot V}\right) - f\left(2 + V + \frac{1}{V}\right)$$

Sharpness Correction Value = S $$\Delta S = f\left(\frac{1}{K \cdot V} - \frac{1}{V}\right), \text{ where}$$

f is the focal length of the objective lens 9.

I claim:

1. A process for generating exposure masks for the production of a high resolution recording medium, said process comprising the following steps:
    (a) providing an exposure system comprising:
        first means for successively holding a plurality of recording originals in place;
        second means for holding a recording substrate for an exposure mask to be generated in place;

means for projecting a respective reduced size image of each of the recording originals onto the recording substrate, and a computer programmed to generate a plurality of commanded position signals based on an actual position of each of the recording originals and a nominal position of the respective reduced size image of the respective recording original on the recording substrate;

(b) mounting a first recording original in the first means and a recording substrate in the second means;

(c) storing in the computer a plurality of nominal coordinate values and measured actual coordinate values of the first recording original and operating the computer (1) to correct for differences between the nominal angular orientation and the actual angular orientation of the first recording original, (2) to determine a suitable scale reduction, and (3) to calculate in response thereto a plurality of position values indicative of the desired relative position of the recording substrate with respect to the first recording original;

(d) operating the computer on the calculated position values to automatically generate the plurality of commanded position signals indicative of the desired relative position of the recording substrate with respect to the first recording original which is effective to reproduce a first reduced size image of the first recording original at the desired position on the recording substrate;

(e) adjusting the relative position of the recording substrate with respect to the first recording original in accordance with the commanded position signals;

(f) reproducing a reduced size image of the first recording original at the desired position on the recording substrate; and then (g) mounting at least a second recording original in the first means and repeating steps (c) through (e) with at least the second recording original to utilize the exposure system to reproduce at least a second reduced size image on the recording substrate at a predetermined position with respect to the first reduced size image in order to generate at least a first reduced size image of the first recording original and a second reduced size image of the second recording original adjusted one with respect to the other on the recording substrate.

2. A process for generating exposure masks for the production of a high resolution recording medium, said process comprising the following steps:

(a) providing an exposure system comprising:
  (1) first means for successively holding a plurality of recording originals in place while permitting rotation of the recording originals, each of said recording originals having a respective plurality of adjusting marks which define two intersecting diagonals;
  (2) second means for holding a recording substrate for an exposure mask to be generated in place;
  (3) means for projecting a respective reduced size image of each of the recording originals along a beam path onto the recording substrate, said projecting means comprising an objective lens;
  (4) a computer programmed to store signals indicative of the nominal positions of the adjusting marks of each of the recording originals and the actual positions of the adjusting marks of each of the recording, originals and to determine the parameters defined below;

(b) mounting a first recording original in the first means and a recording substrate in the second means;

(c) storing in the computer the nominal coordinate values of the adjusting marks of the first recording original;

(d) measuring and storing in the computer the actual coordinate values of the adjusting marks of the first recording original;

(e) operating the computer to automatically process the coordinate values stored in steps (c) and (d) to determine the following parameters:
  (1) the angle of rotation of the first recording original needed to position the recording original in a predetermined angular orientation;
  (2) the actual lengths of the diagonals defined by the adjusting marks;
  (3) the actual coordinate values of the intersection point of the diagonals;
  (4) a reduction scale correction factor K as a function the deviation of the actual size of the first recording original from a predefined nominal size;

(f) rotating the first recording original by the angle of rotation determined by the computer in step (e)(1);

(g) operating the computer to automatically determine the following parameters:
  (1) the new actual coordinate values of the actual diagonal intersection point of the rotated first recording original, said new actual coordinate values being corrected by the reduction scale correction factor K determined in step (e)(4);
  (2) a plurality of commanded coordinate values for the second means as a function of a comparison of the coordinate values determined in step (g)(1) and the nominal coordinate values of the nominal diagonal intersection point;
  (3) a commanded coordinate value for the position of the objective lens of the projecting means along the beam path and a sharpness correction value for the position of the objective lens with respect to the recording substrate as a function of the focal length of the objective lens and the correction factor K determined in step (e)(4);

(h) correcting the separation between the objective lens and the recording substrate if necessary;

(i) positioning the recording substrate to the commanded coordinate values determined in step (g)(2) and the objective lens to the commanded coordinate value determined in step (g)(3);

(j) operating the projecting means to reproduce a reduced size image of the first recording original on the recording substrate;

(k) repeating steps (b) through (j) with at least a second recording original in order to reproduce reduced size images of at least two recording originals adjusted one with respect to the other on the recording substrate; and then (l) developing the recording substrate and generating an exposure mask therefrom by photolithographic means.

3. The invention of claim 2 wherein step (h) is performed when the sharpness correction value exceeds a predetermined value.

4. The invention of claim 2 wherein the projecting means comprises an illumination unit and a condenser lens; wherein the second means is shiftable in two dimensions; wherein the objective lens is shiftable in one dimension along the beam path, and wherein the exposure system further comprises means for scanning the plurality of adjusting marks to measure the position thereof.

5. The invention of claim 4 wherein the illumination unit comprises a mercury vapor high pressure lamp, and wherein the projecting means further comprises a diaphragm.

6. The invention of claim 2 wherein the first means comprises:
   a base plate;
   a frame mounted on the base plate;
   a circular, planar mounting plate for holding the first recording original; and
   means for mounting the mounting plate on the frame such that the mounting plate is rotatable about an axis of rotation oriented parallel to the beam path.

7. The invention of claim 4 wherein the scanning means comprises a video microscope mounted via first and second airborne slide pieces on a base plate to move across the first recording original.

8. The invention of claim 2 wherein the second means comprises:
   a first airborne slide piece slideable in an x direction with respect to a base plate;
   a second airborne slide piece mounted on the first slide piece to slide in a y direction;
   means for holding the recording substrate on the second slide piece by suction.

9. The invention of claim 2 wherein the objective lens is mounted on an airborne slide piece which is slideable along the beam path.

10. The invention of claim 6 further comprising an angle measuring device coupled to the mounting plate to measure the angular position thereof, said angle measuring device comprising a counter.

11. The invention of claim 7 further comprising first and second length measuring devices coupled to the first and second slide pieces, respectively, to measure the respective positions thereof.

12. The invention of claim 8 further comprising first and second length measuring devices coupled to the first and second slide pieces, respectively, to measure the respective positions thereof.

13. The invention of claim 2 further comprising numerical control means coupled to the computer, the second means, and the projecting means for automatically positioning the recording substrate and the objective lens as defined in step (i).

* * * * *

UNITED STATES PATENT AND TRADEMARK OFFICE
CERTIFICATE OF CORRECTION

PATENT NO. : 4,505,580

DATED : March 19, 1985

INVENTOR(S) : Dieter Michel

It is certified that error appears in the above-identified patent and that said Letters Patent is hereby corrected as shown below:

<u>IN TABLE I</u>

In column 6 (equation 5, line 22), please delete "desired" (second occurrence) and substitute therefor --actual--;

Signed and Sealed this

Eleventh Day of November, 1986

*Attest:*

DONALD J. QUIGG

*Attesting Officer*     *Commissioner of Patents and Trademarks*